United States Patent Office 2,875,231
Patented Feb. 24, 1959

2,875,231
CATALYTIC PROCESS OF REACTING A PHOSPHITE AND LACTONE

Richard L. McConnell and Harry W. Coover, Jr., Kingsport, Tenn., assignors to Eastman Kodak Company, Rochester, N. Y., a corporation of New Jersey No Drawing. Application February 14, 1956
Serial No. 565,322

18 Claims. (Cl. 260—461)

This invention relates to an improved process for preparing organophosphorus compounds. In a specific aspect, this invention relates to an improvement in the process for reacting dialkyl hydrogen phosphites and trialkyl phosphites with lactones.

Dialkyl hydrogen phosphites and trialkyl phosphites react with lactones to produce phosphonates but these phosphites attack the lactone ring in different manners. For example, a trialkyl phosphite atacks β-propiolactone at the β-carbon atom causing an alkyl-oxygen cleavage of the lactone ring to yield 3-(dialkyl phosphono)-propionates. Dialkyl hydrogen phosphites cause an acyl-oxygen cleavage of β-propiolactone to yield dialkyl 3-hydroxy-1-oxopropyl phosphonates. These latter phosphonates can react with additional dialkyl hydrogen phosphite to produce tetraalkyl 1,3-dihydroxy propylidene diphosphonates. The reaction of a trialkyl phosphite, such as triethyl phosphite, with a lactone, such as β-propiolactone, can be expressed as follows:

(1)
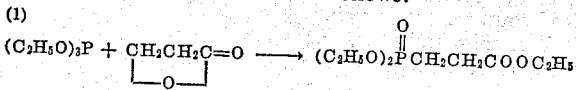

The reaction of a dialkyl hydrogen phosphite, such as diethyl hydrogen phosphite, with β-propiolactone can be expressed as follows:

(2)
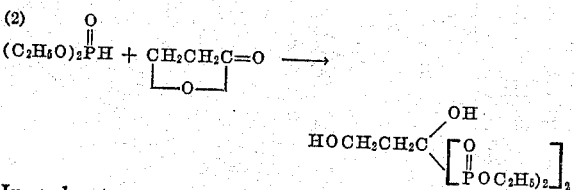

In order to proceed to completion, each of the above reactions requires a reaction period of about 16 hours at a temperature of 150° C. and at lower reaction temperatures longer reaction periods are necessitated.

In accordance with this invention, it has been found that when a dialkyl hydrogen phosphite or a trialkyl phosphite is reacted with a lactone substantially shorter reaction periods and substantially lower reaction temperatures can be employed if the reaction is effected in the presence of a basic catalyst selected from the group consisting of tertiary amines, alkali metal alkoxides and alkali metal amides. For example, reactions 1 and 2 above proceed to completion in a period not in excess of about 8 hours at a temperature not in excess of 25° C. when the catalysts of this invention are employed.

In practicing this invention, the reaction of a dialkyl hydrogen phosphite or a trialkyl phosphite can be carried out in the absence or presence of an inert solvent. The following solvents can be used: toluene, xylene, chlorobenzene, dibutyl ether and tetrachloroethane. However, it is preferred to carry out the reaction in the absence of a solvent. The reaction temperature usually varies from 0 to 225° C. For example, when β-propiolactone is employed in the reaction, the preferred temperature is within the range of 0 to 130° C. and when γ-lactones are employed, the preferred reaction temperature is within the range of 25 to 225° C. Reaction periods within the range of 1 to 8 hours are sufficient. However, if desired, longer reaction times can be used.

Generally, the reaction is carried out by mixing the lactone and phosphite at about 25° C. and adding the basic catalyst with stirring. When β-propiolactone is used, the reaction is exothermic. With the less reactive γ-lactones, such as γ-butyrolactone, heating is required to initiate the reaction. A number of products can be produced in accordance with this invention depending upon the concentration of reactants. For example, if equimolar quantities of triethyl phosphite and β-propiolactones are used, the primary products are:

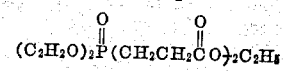

and

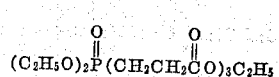

If two or more moles of triethyl phosphite per mole of β-propiolactone are used, then ethyl 3-diethylphosphonopropionate having the structural formula:

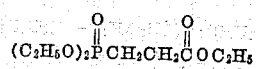

is obtained in addition to the products named above. When less than one mole of triethyl phosphite per mole of β-propiolactone is used, the reaction becomes a telomerization and polymeric materials which contain a diethylphosphono end group are obtained. These products range from viscous oils having a molecular weight of about 500 to white solids having a molecular weight of about 1150 and contain phosphorus groups only at the end of the polymer chain. Examples 1, 2 and 3 below demonstrate the variation in products obtained by varying the molar ratios of reactants.

The products produced in accordance with this invention are useful as plasticizers, solvents, insecticides and intermediates for the preparation of other organophosphorus compounds. Cellulose esters, such as cellulose acetate containing 15–20 parts of the compounds of this invention per part of ester are self-extinguishing.

A practical range for the amount of catalyst to be used in practicing this invention varies from 0.1 to 10 mole percent of the reaction mixture. However, concentrations outside of this range can be used without departing from the scope of the invention.

The following examples are illustrative of this invention:

Example 1.—Ethyl 3-diethylphosphonopropionate

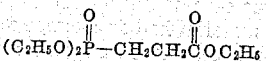

Triethyl phosphite (133 g., 0.8 mole) and β-propiolactone (28.8 g., 0.4 mole) were mixed in a round bottom flask and stirred while triethylamine (5 ml.) was added. The temperature gradually rose to a maximum of 38° C. The reaction mixture was stirred for 6 hours. After stripping off the excess triethyl phosphite, 19.0 g. of product boiling at 140–145° C. at 5.0 mm. was obtained ($n_D^{20}$ 1.4330). The distillation residue (30 g.) was a light yellow oil. This consisted primarily of telomers of low molecular weight having the following formula:

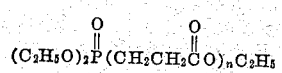

where $n$ is a small, whole integer such as 2, 3, 4 or 5.

Similar results were obtained using 0.5 g. of sodium methoxide powder, or 0.5 g. of sodium amide as the catalyst.

*Example 2.—Ethyl O - (3 - diethylphosphonopropionyl) - hydracrylate and ethyl O-(3-diethylphosphonopropionyl)dihydracrylate*

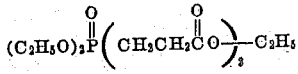

and

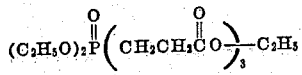

Triethyl phosphite (66.4 g., 0.4 mole) and β-propiolactone (28.8 g., 0.4 mole) were mixed in a round bottom flask and stirred while tributylamine (5 ml.) was added. The temperature gradually rose to 130° C. over a thirty-minute period. The reaction mixture was then stirred for 3 hours. After removing the unreacted triethyl phosphite, 17.0 g. of

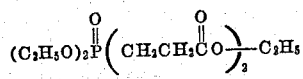

was obtained which boiled at 130–140° C. at 0.4 mm. (% P=10.02, 10.23; % P theory=9.98%).

Then 19.0 g. of product,

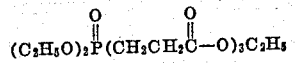

distilled over at 144–151° C. at 0.4 mm. (% P=8.07, 7.83; % P theory=8.10).

*Example 3.—Ethyl O-(3-diethylphosphonopropionyl)-polyhydracrylate*

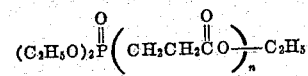

Triethyl phosphite (16.6 g., 0.1 mole) and β-propiolactone (28.8 g., 0.4 mole) were mixed in a round bottom flask and cooled externally while triethylamine (3 ml.) was added dropwise with stirring. The reaction is extremely exothermic. After the initial vigorous reaction had subsided, the reaction mixture was stirred at 25° C. for 4 hours, and then allowed to stand overnight. The reaction mixture was a viscous, light yellow oil which contained products of the following general structure:

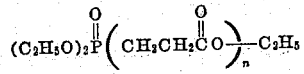

where $n$ is a whole positive integer ranging from 1 to about 20. The average molecular weight of the polymers was 490 (ebulliometric determinations in benzene). These telomers can be pyrolyzed at high temperatures to produce acrylic acid.

Using sodium methoxide as the catalyst, some white solid telomer was obtained in addition to the viscous oil. The white solid material had an average molecular weight of 1150 while the oil again had a molecular weight of about 500.

*Example 4.—Ethyl 4-diethylphosphonobutyrate*

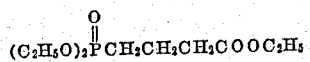

Triethyl phosphite (133.0 g., 0.8 mole), γ-butyrolactone (34.4 g., 0.4 mole), and triethylamine (10 ml.) were mixed and heated in a rocking autoclave at 225° C. for 8 hours. After triethylamine and the excess triethyl phosphite had been stripped off, 14.0 g. of ethyl 4-diethylphosphonobutyrate, B. P. 121–123° C. at 1.0 mm., $n_D^{20}$ 1.4361, was obtained. About 15 g. of telomer remained in the distillation flask as a nondistillable viscous oil.

*Example 5.—Tetraethyl 1,3-dihydroxypropylidenediphosphonate*

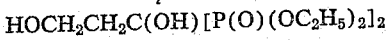

Diethyl hydrogen phosphite (55.2 g., 0.4 mole) and β-propiolactone (14.4 g., 0.2 mole) were mixed in a round bottom flask and stirred while triethylamine (6 ml.) was added. The temperature gradually rose to 42° C. After the temperature started to drop, the reaction mixture was heated on a steam bath with stirring for 6 hours. After stripping off the excess diethyl hydrogen phosphite to a head temperature of 65° C. at 4.0 mm., the material was distilled molecularly in an alembic-type pot still. The product distilled over at 132–143° C. at 1 micron, $n_D^{20}$ 1.4466, as a transparent, viscous oil.

*Example 6.—Butyl 3-dibutylphosphonopropionate*

Tributyl phosphite (200 g., 0.8 mole) and β-propiolactone (28.8 g., 0.4 mole) were reacted according to the procedure of Example 1 except that 0.5 g. of sodium methoxide powder was used as the catalyst rather than triethylamine. The product distilled at 160–164° C. at 2.4 mm. A viscous non-distillable telomer was left as a distillation residue. Other alkoxides that can be used as catalysts are sodium ethoxide, sodium butoxide, potassium methoxide, potassium ethoxide and potassium butoxide.

*Example 7.—2-Ethylhexyl 3-(di-2-ethylhexylphosphono)-propionate*

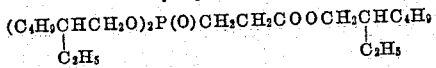

Tris(2-ethylhexyl)phosphite (33.5 g., 0.8 mole) and β-propiolactone (28.8 g., 0.4 mole) were reacted according to the procedure of Example 1 except that 0.5 g. of sodium amide was used as the catalyst. The product was a viscous, transparent oil.

Potassium amide can be used as the catalyst in a similar type reaction.

*Example 8.—Ethyl 4-(diethylphosphono)valerate*

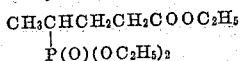
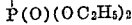

Triethyl phosphite (133.0 g., 0.8 mole) and γ-valerolactone (40.0 g., 0.4 mole) were reacted according to the procedure of Example 4 using 5 ml. of pyridine as the catalyst. The product obtained after removal of the excess triethyl phosphite was an amber colored oil.

*Example 9.—Tetraisobutyl 1,3-dihydroxypropylidenediphosphonate*

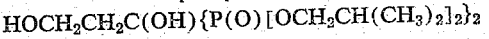

Diisobutyl hydrogen phosphite (194.2 g., 1.0 mole) and β-propiolactone (28.8 g., 0.4 mole) were reacted according to the procedure of Example 5 using 2 ml. of triisobutylamine as the catalyst. After removing the excess diisobutyl hydrogen phosphite under reduced pressure, the product was left as a viscous oil.

*Example 10.—Tetrabutyl 1,4-dihydroxybutylidenediphosphonate*

This product was prepared by reacting dibutyl hydrogen phosphite (194.2 g., 1.0 mole) and γ-butyrolactone (34.4 g., 0.4 mole) in an autoclave at 225° C. for 8 hours using 0.2 g. of sodium butoxide as the catalyst.

We claim:

1. The process for producing organophosphorus compounds which comprises reacting a phosphite selected from the group consisting of trialkyl phosphites and dialkyl hydrogen phosphites, the alkyl radicals each containing from 1 to 8 carbon atoms with a lactone selected from the group consisting of β-lactones and γ-lactones containing up to 5 carbon atoms in the presence of a basic catalyst selected from the group consisting of tertiary amines, alkali metal alkoxides and alkali metal amides.

2. The process for producing organophosphorus compounds which comprises reacting a phosphite selected from the group consisting of trialkyl phosphites and dialkyl hydrogen phosphites, the alkyl radicals each containing from 1 to 8 carbon atoms with a lactone selected from the group consisting of β-lactones and γ-lactones containing up to 5 carbon atoms in the presence of a basic catalyst selected from the group consisting of tertiary amines, alkali metal alkoxides and alkali metal amides at a temperature within the range of 0 to 225° C. and for a period of time not substantially in excess of 8 hours.

3. The process for producing organophosphorus compounds which comprises reacting a phosphite selected from the group consisting of trialkyl phosphites and dialkyl hydrogen phosphites, the alkyl radicals each containing from 1 to 8 carbon atoms with a lactone selected from the group consisting of β-lactones and γ-lactones containing up to 5 carbon atoms in the presence of a tertiary amine at a temperature within the range of 0 to 225° C. for a period of time not substantially in excess of 8 hours.

4. The process for producing organophosphorus compounds which comprises reacting a phosphite selected from the group consisting of trialkyl phosphites and dialkyl hydrogen phosphites, the alkyl radicals each containing from 1 to 8 carbon atoms with a lactone selected from the group consisting of β-lactones and γ-lactones containing up to 5 carbon atoms in the presence of triethylamine at a temperature within the range of 0 to 225° C. and for a period of time not substantially in excess of 8 hours.

5. The process for producing organophosphorus compounds which comprises reacting triethyl phosphite with β-propiolactone in the presence of triethylamine at a temperature within the range of 0 to 130° C. for a period not substantially in excess of 8 hours.

6. The process for producing organophosphorus compounds which comprises reacting a phosphite selected from the group consisting of trialkyl phosphites and dialkyl hydrogen phosphites, the alkyl radicals each containing from 1 to 8 carbon atoms with a lactone selected from the group consisting of β-lactones and γ-lactones containing up to 5 carbon atoms in the presence of tributylamine at a temperature within the range of 0 to 225° C. for a period of time not substantially in excess of 8 hours.

7. The process for producing organophosphorus compounds which comprises reacting triethyl phosphite with β-propiolactone in the presence of tributylamine at a temperature within the range of 0 to 130° C. for a period of time not substantially in excess of 8 hours.

8. The process for producing organophosphorus compounds which comprises reacting a phosphite selected from the group consisting of trialkyl phosphites and dialkyl hydrogen phosphites, the alkyl radicals each containing from 1 to 8 carbon atoms with a lactone selected from the group consisting of β-lactones and γ-lactones containing up to 5 carbon atoms in the presence of an alkali metal alkoxide at a temperature within the range of 0 to 225° C. for a period of time not substantially in excess of 8 hours.

9. The process for producing organophosphorus compounds which comprises reacting a phosphite selected from the group consisting of trialkyl phosphites and dialkyl hydrogen phosphites, the alkyl radicals each containing from 1 to 8 carbon atoms with a lactone selected from the group consisting of β-lactones and γ-lactones containing up to 5 carbon atoms in the presence of sodium methoxide at a temperature within the range of 0 to 225° C. for a period of time not substantially in excess of 8 hours.

10. The process for producing organophosphorus compounds which comprises reacting tributyl phosphite with β-propiolactone in the presence of sodium methoxide at a temperature within the range of 0 to 130° C. for a period of time not substantially in excess of 8 hours.

11. The process for producing organophosphorus compounds which comprises reacting a phosphite selected from the group consisting of trialkyl phosphites and dialkyl hydrogen phosphites, the alkyl radicals each containing from 1 to 8 carbon atoms with a lactone selected from the group consisting of β-lactones and γ-lactones containing up to 5 carbon atoms in the presence of sodium butoxide at a temperature within the range of 0 to 225° C. for a period of time not substantially in excess of 8 hours.

12. The process for producing organophosphorus compounds which comprises reacting dibutyl hydrogen phosphite with γ-butyrolactone in the presence of sodium butoxide at a temperature within the range of 25 to 225° C. for a period of time not substantially in excess of 8 hours.

13. The process for producing organophosphorus compounds which comprises reacting a phosphite selected from the group consisting of trialkyl phosphites and dialkyl hydrogen phosphites, the alkyl radicals each containing from 1 to 8 carbon atoms with a lactone selected from the group consisting of β-lactones and γ-lactones containing up to 5 carbon atoms in the presence of an alkali metal amide at a temperature within the range of 0 to 225° C. for a period of time not substantially in excess of 8 hours.

14. The process for producing organophosphorus compounds which comprises reacting a phosphite selected from the group consisting of trialkyl phosphites and dialkyl hydrogen phosphites, the alkyl radicals each containing from 1 to 8 carbon atoms with a lactone selected from the group consisting of β-lactones and γ-lactones containing up to 5 carbon atoms in the presence of sodium amide at a temperature within the range of 0 to 225° C. for a period of time not substantially in excess of 8 hours.

15. The process for producing organophosphorus compounds which comprises reacting tris (2-ethyl hexyl) phosphite with β-propiolactone in the presence of sodium amide at a temperature within the range of 0 to 130° C. for a period of time not substantially in excess of 8 hours.

16. The process for producing ethyl O-(3-diethylphosphonopropionyl) hydracrylate and ethyl O-(3-diethylphosphonopropionyl) dihydracrylate which comprises reacting triethyl phosphite with a substantially equimolar amount of β-propiolactone in the presence of a trialkylamine at a temperature within the range of 0 to 130° C. for a period of time not substantially in excess of 8 hours.

17. The process for producing ethyl 3-diethylphosphonopropionate which comprises reacting triethyl phosphite with β-propiolactone, said phosphite being present in an amount of at least 2 moles per mole of said lactone, in the presence of a trialkylamine at a temperature within the range of 0 to 130° C. for a period of time not substantially in excess of 8 hours.

18. The process for producing polymeric organophosphorus compounds having a molecular weight within the range of 500 to 1150 which comprises reacting triethyl phosphite with β-propiolactone, said phosphite being present in an amount less than 1 mole per mole of said lactone, in the presence of a trialkylamine at a temperature within the range of 0 to 130° C. for a period of time not substantially in excess of 8 hours.

References Cited in the file of this patent

UNITED STATES PATENTS 2,652,416   Coover et al. _____ Sept. 15, 1953

FOREIGN PATENTS 693,742   Great Britain _____ July 8, 1953